Patented Aug. 19, 1947

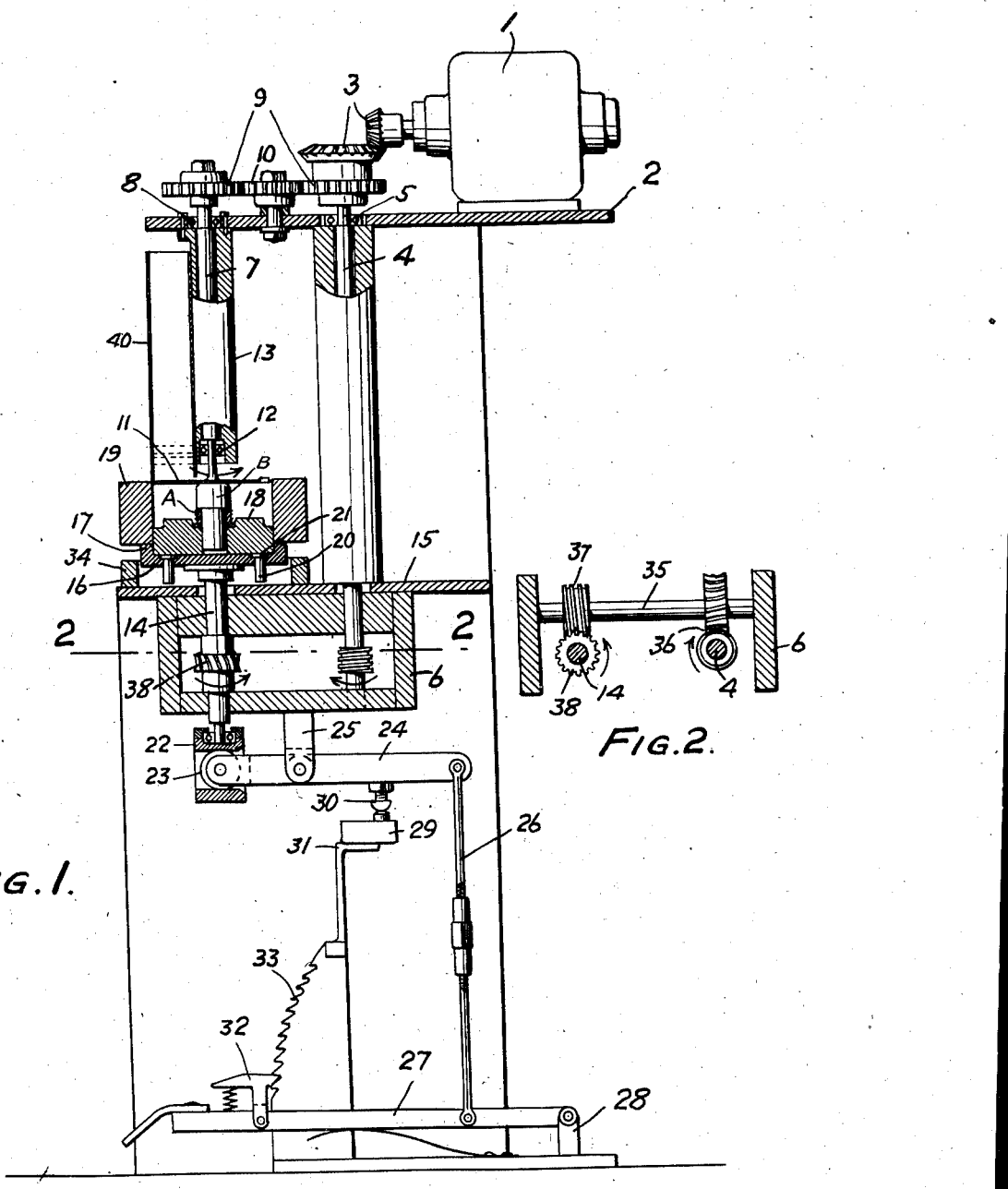

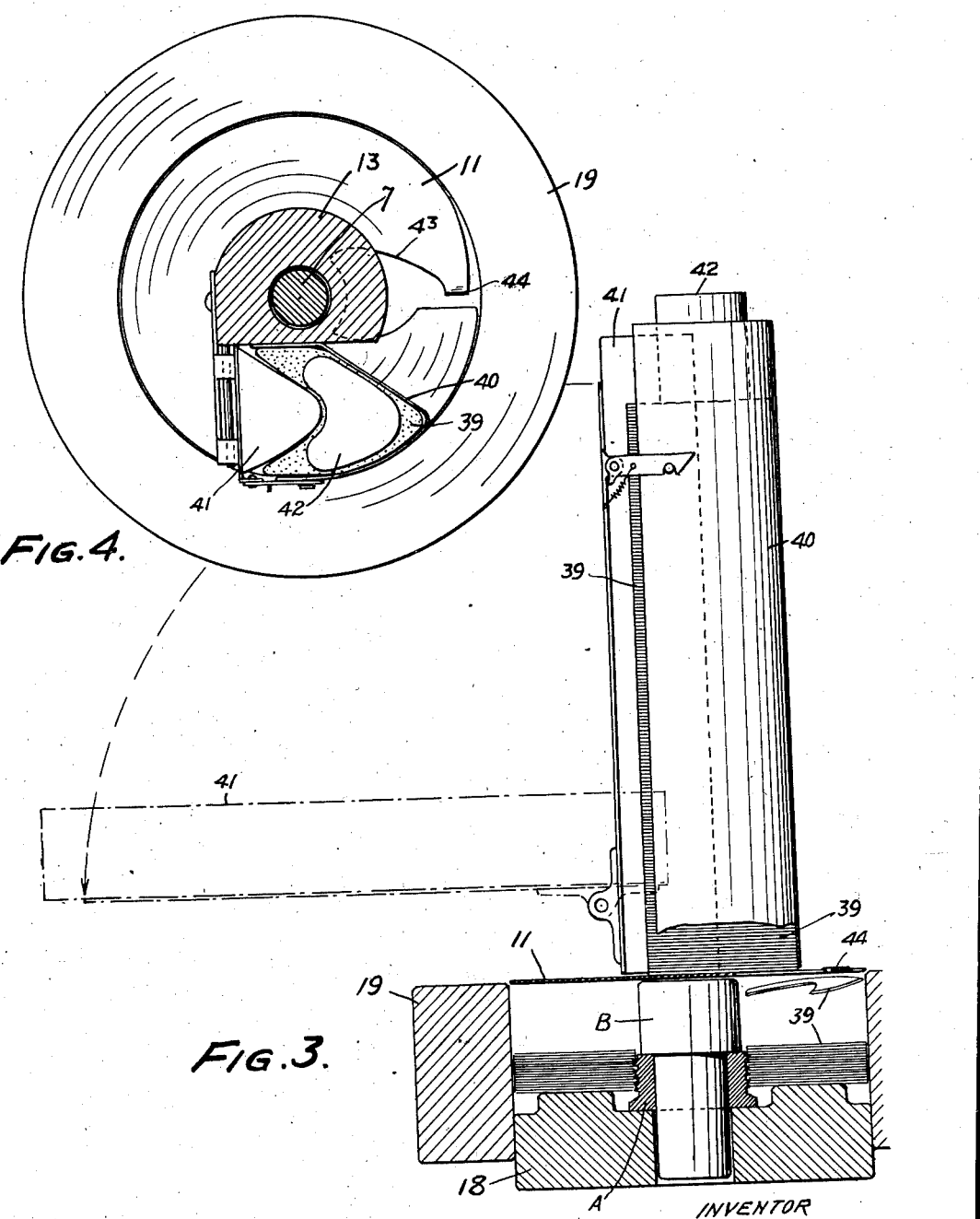

2,425,835

UNITED STATES PATENT OFFICE 2,425,835

APPARATUS FOR CHARGING MOLDS FOR GEARS

Wayne R. Scherer, Trooper, Pa., assignor to Taylor Fibre Company, Norristown, Pa., a corporation of Pennsylvania Application September 7, 1944, Serial No. 552,943

9 Claims. (Cl. 154—1)

This invention relates to a novel apparatus for the charging of molds and, more particularly, for the charging of molds for the production of gear blanks from impregnated fibrous material.

As is well known, in the making of so-called fibre gears a plurality of sections or segments of fibrous material, as, for example, paper or fabric, impregnated with a thermosetting resin, as, for example, a phenol formaldehyde resin, are laid up in overlapping relation in a mold in which they are subjected to heat and pressure to form a gear blank.

The sections or segments usually used for the formation of gear blanks are generally chevron shaped so that they may be laid up in the mold in a manner such that more material will be provided for the formation of the rim portion of the blank, into which the teeth are cut, and the portion surrounding the hub, which is usually formed by a metal insert, than is provided for the thinner web portion of the blank.

Heretofore it has been customary to lay up or charge the mold with a considerable number of segments for the formation of a gear blank by hand, the several segments being laid into the mold individually by an operator. Such manual charging of the mold is a time consuming and a relatively expensive step in the production of gear blanks, and unless done by a relatively skilled operator may easily result in non-uniform or faulty product.

Now in accordance with this invention there is provided a form of apparatus, simple in construction and operation, by which the segmental elements for the formation of gear blanks may be rapidly and accurately laid up in a mold mechanically, it being only necessary to manually charge into the apparatus the requisite number of segments for a given mold, place a mold for charging and remove it when charged.

Having now indicated, in a general way, the nature and purpose of this invention, I will proceed to a detailed description of a preferred embodiment thereof with reference to the accompanying drawings, in which:

Figure 1 is an elevation, partly in section, of a form of apparatus embodying this invention.

Figure 2 is a sectional view on line 2—2, Figure 1, showing a detail of construction of the apparatus shown in Figure 1.

Figure 3 is a sectional view showing a detail of the construction of the apparatus shown in Figure 1.

Figures 4–6 are views, variously partly in section, showing, in detail, elements of the apparatus shown in Figure 1 to clarify details of construction.

Figure 7:
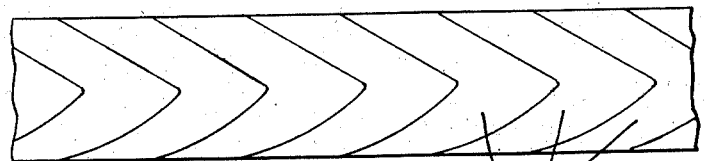
Figure 7 is a plan view showing segments of impregnated fibrous material for the formation of a gear blank, as formed by cutting from a strip.

Referring to the several figures, in which like parts are indicated by like reference characters, 1 indicates a prime mover, as an electric motor mounted on a bracket 2 and connected through bevel gears 3 to drive a vertical shaft 4, journaled adjacent to its upper end in a ball bearing 5, mounted in the bracket 2 and supported at its lower end in the bottom of a bracket 6.

A second vertical shaft 7 is journaled adjacent its upper end in a ball bearing 8, mounted in the bracket 2, and is adapted to be driven from and in the same direction as shaft 3, through gears 9, 9 and idler gear 10. The lower end portion of shaft 7 is reduced in diameter and carries at its end the disc 11 shown in Figure 5 and which will be described in detail hereinafter. The shaft 7 is supported by a ball bearing 12 mounted in the lower end of a fixed casing 13 about the shaft.

In line with the shaft 7 is a vertical shaft 14 supported by bracket 6 and carrying on its upper end, above a table 15, a mold support 16. The mold support 16 is provided with a flange 17 and is adapted to support the base member 18 of a gear blank mold within the flange 17 and to support the body or ring member 19 of the mold on the flange 17, as shown in Figure 1. Extending loosely through and below the mold support 16 is a pair of pins 20, 20, saved from dropping out by their heads 21, which are countersunk into the surface of the support. On the table 15, extending about the mold support 16, is a circular support 34 of a height about equal to the length of pins 20, 20.

The lower end of shaft 14 is supported in a block 22 carried through a roller 23 on one end of a lever 24 fulcrumed on a hanger 25 depending from bracket 6. The other end of lever 24 is connected through an adjustable link 26 with a foot lever 27, fulcrumed at one end on a bracket 28. A switch 29, adapted to be opened and closed by a member 30 carried on lever 24, is supported on a bracket 31 and a pawl 32, carried by foot lever 27, is adapted to engage with a ratchet 33 to hold lever 27.

The shaft 14 is driven, in a direction opposite to that of shaft 7, from shaft 4, through a countershaft 35 journaled in bracket 6 and driven by shaft 4 through gearing 36 to drive shaft 14, through a worm 37 on shaft 35 and a gear 38 slidably mounted on shaft 14.

Figure 6:
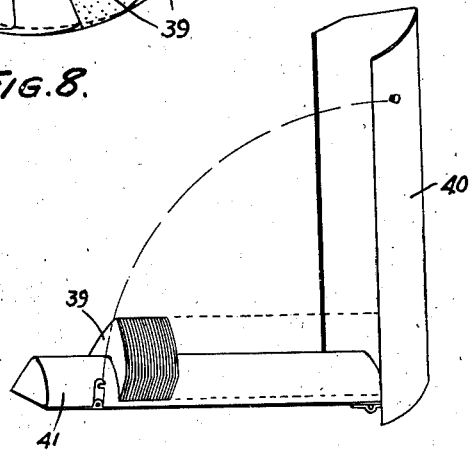

Supported by the casing 13 about shaft 7 is a magazine for the chevron-like segments 39 (Figure 7), to be charged into a mold. The magazine, as shown in Figure 6, comprises a body 40 having the contour of the segments 39 and provided with a hinged closure 41, adapted to be swung out to enable charging of the magazine and to engage the segments within the body and serve to guide them as they are discharged from the body. The lower end of the body 40, when the closure is in closing position, presents an opening of the contour of the segments 39 and is positioned above the disc 11 a distance not substantially in excess of the thickness of the segments. When the magazine is charged with segments the lowermost segment will lie upon the disc 11. A weight 42 lies on top of the charge of segments 39 in the magazine, as shown in Figure 4, in order to facilitate their discharge from the lower end of the magazine.

Figure 5:
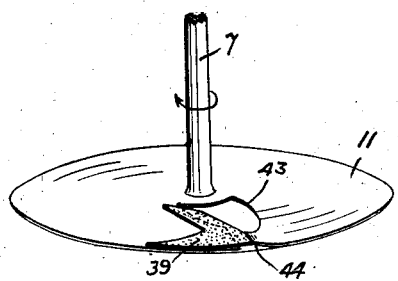

The disc 11 carried on the lower end of shaft 7, as shown in Figures 4 and 5, is provided with an opening 43 extending inwardly from its periphery and so shaped as to pass a segment 39 through the disc in a relatively flat position as the disc rotates, as shown in Figure 5. A lip or finger 44 is formed by bending upwardly the portion of the disc 11 adjacent to its periphery at the rear of the opening 43 with respect to its direction of rotation, as indicated by the arrow Figure 5. The lip extends upwardly sufficiently and presents a sharp edge so that as the disc rotates the lip will engage between the lowermost segment 39, resting upon the disc 11, and the segment next above; and, as the disc continues to rotate, will cause the lowermost segment to pass through the opening 43 to fall into the mold which is positioned beneath the disc.

In constructing the machine according to this invention as described, for example, above, as has been noted, the shaft 7, carrying the disc 11, and the shaft 14, upon which is mounted, to rotate therewith, the mold comprising the base member 18 and the ring member 19, are driven in opposite directions. The shaft 7 is driven from the motor 1 through the gearing 3, 3 and 9, 10, 9; and the shaft 14 is driven from the motor 1 through the gearing 3, 3 to the shaft 4 and the gearing shown in Figure 2.

Further, the shafts 7 and 14 will be driven at different speeds. Thus, for example, if it be assumed that the motor 1 has a speed of 1750 R. P. M., the gearing to shaft 7 may be, for example, such that the shaft 7 will be driven at half motor speed or at 875 R. P. M., which will result in rotation of the disc 11 at that speed. The gearing to shaft 14 in such case, may be, for example, such that shaft 14, and consequently the mold, will be rotated at 17.5 R. P. M.

It will, of course, be appreciated that the relative speeds of rotation of the shafts 7 and 14, and, consequently, the relative speeds of the disc 11 and of the mold are not an essential part of this invention and may be varied as described to suit conditions, such as the particular form of elements to be charged into, mold, amount of overlap of elements in the mold, etc.

The operation of the apparatus above described will, it is believed, be apparent. However, in idle position the foot lever 27 will be in an upward position with the switch 30 open as a result of the effect of the weight of shaft 14 and mold support 17 on the lever 24, the mold support will be down on the table 15 and the pins 20, due to contact with the table 15, will extend above the support with their heads about on a level with the top of the flange 17, the top of which will be about on a level with the circular support 34.

The magazine 40 being charged with segments 39, a mold base member 18 is placed on the support 16 so as to lie within the flange 17. At this point the mold base will be supported on the heads of the pins 20. The ring member 19 of the mold is then positioned on the flange 17 of the support 16.

Placed within a central recess in the mold base member 18 is a flanged annular member A, held in a central position in the mold base by a headed pin B. The periphery of the member A is serrated and is retained in the mold when the blank is compressed and heat treated and forms a central metallic bushing for the cured blank, which will have an interengaging driving connection with the gear blank.

The apparatus is now started by depressing the foot lever 27 to turn the lever 24, close the switch 30 and raise the mold base 16 on which the mold members are supported to charging position.

Figure 8:
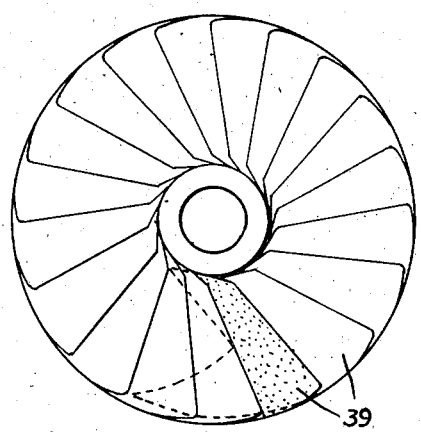
Figure 8 is a top view of a mold charged with segments, such as are shown in Figure 7.

As the adjustable lip or finger 44, formed on disc 11, passes beneath the magazine 40, in the rotation of shaft 7, it will engage the lowermost segment 39 in the magazine and cause it to pass through the opening 43 in the disc to fall into the mold. Thus, successive segments 39 will be, as it were, dropped into the mold as the disc 11 continues to rotate. Since the mold is rotating in a direction opposite to that of the disc and at a considerably slower speed, the successive segments will be laid into the mold in overlapped relation, as shown in Figure 8.

As will be appreciated, the opening 43 in disc 11 is so formed as to cause the segments to fall and lie in the mold in desired position, while the relative speed of rotation of the disc and mold will govern the overlapping of the segments as they are laid into the mold.

Assuming that the proper number of segments are charged into the magazine 40 to fill the mold, the apparatus is stopped by the release of foot lever 27, which permits the switch 30 to be opened under the weight of the mold acting on lever 24; and which permits dropping of the shaft 14 and the mold support so that the ring member 19 rests upon the support 34 and the base member 18 is lifted, by engagement of the pins 20 with the table 15, above the flange 17 on the support and into line with the bottom of the ring member resting on the support 34. The mold, thus disengaged from the support 17, may be readily removed from the apparatus for compression and heat treatment of the segments 39 for the formation of the gear blank around the bushing A.

What I claim and desire to protect by Letters Patent is:

1. Apparatus for charging a mold with a plurality of elements which includes, in combination, means for supporting and continuously rotating a mold in a given direction, a magazine, means for directing a plurality of elements into a mold successively from said magazine and means for continuously rotating said last mentioned means in a direction opposite to the direction of rotation of said mold supporting and rotating means.

2. Apparatus for charging a mold with a plurality of elements which includes, in combination, means for supporting and continuously rotating a mold in a given direction, a magazine, means for directing a plurality of elements into a mold successively from said magazine and means for continuously rotating said last mentioned means in a direction opposite to the direction of rotation of said means for rotating a mold and at a speed of rotation greater than that of said mold supporting and rotating means.

3. Apparatus for charging a mold with a plurality of elements which includes, in combination, means for supporting and rotating a mold in a given direction, a fixed magazine for containing a supply of elements to be charged into a mold, means rotatable with respect to said magazine for removing elements successively from said magazine and charging them successively into the mold and means for rotating said last mentioned means in a direction opposite to the direction of rotation of said mold supporting and rotating means.

4. Apparatus for charging a mold with a plurality of elements which includes, in combination, means for supporting and rotating a mold in a given direction, a fixed magazine for containing a supply of elements to be charged into a mold, means rotatable with respect to said magazine for removing elements successively from said magazine and charging them successively into a mold and means for rotating said last mentioned means in a direction opposite to the direction of rotation of said mold supporting and rotating means and at a speed of rotation greater than that of said means for rotating a mold.

5. Apparatus for charging a mold with a plurality of elements which includes a pair of vertically extending aligned shafts, a mold support carried on the lower shaft, a magazine for elements to be charged into a mold, means carried on the upper shaft adjacent to the mold for removing elements successively from said magazine and charging them successively into a mold and means for rotating said shafts in opposite directions, said means effecting rotation of the lower shaft at a speed less than that at which the upper shaft is rotated.

6. Apparatus for charging a mold with a plurality of elements which includes a pair of vertically extending aligned shafts, a mold support lying in a plane at right angles to the axis of the lower shaft and carried thereby, a disc carried by the upper shaft and lying in a plane adjacent to and parallel to that of the mold support, a magazine for elements to be charged into a mold positioned adjacent to said disc, and means to rotate said shafts in opposite directions, said disc being provided with an opening extending from its periphery and with a finger adjacent to said opening and adapted, in the rotation of the upper shaft, to engage elements in said magazine successively and cause them to pass through said opening toward said mold support.

7. Apparatus for charging a mold with a plurality of elements which includes a pair of vertically extending aligned shafts, the lower shaft being axially movable, a mold support lying in a plane at right angles to the axis of the lower shaft and carried thereby, a disc carried by the upper shaft and lying in a plane adjacent to and parallel to that of the mold support, a magazine for elements to be charged into a mold positioned adjacent to said disc, means to rotate said shafts in opposite directions, said disc being provided with an opening extending from its periphery and with a finger adjacent to said opening and adapted, in the rotation of the upper shaft, to engage elements in said magazine successively and cause them to pass through said opening toward said mold support, said lower shaft being movable downwardly under the weight of said mold support and means for moving said lower shaft upwardly.

8. An apparatus for charging a mold with a plurality of elements in overlapping relation, comprising a mold, means for supporting the mold, means for rotating the mold support, a fixed magazine above the mold support, rotating means for directing a plurality of elements successively from the magazine into the rotating mold and means for rotating said last mentioned means at a higher speed than the speed of the first rotating means, to cause successive elements charged in the mold to overlap a predetermined distance.

9. An apparatus for charging molds with a plurality of elements in overlapping relation, comprising a mold support mounted for rotation, means for rotating the mold support, a fixed magazine for the elements above the mold support, rotatable means between the magazine and the mold support for successively delivering elements to a mold from the magazine, the axis of the delivery means being substantially in alignment with the axis of the mold support, and means for rotating the delivery means at a higher speed than the speed of the mold support, to cause successive elements charged in the mold to overlap a predetermined distance.

WAYNE R. SCHERER.

REFERENCES CITED

The following references are of record in the file of this patent:

UNITED STATES PATENTS

| Number | Name | Date |
|---|---|---|
| 1,742,388 | Godfrey | Jan. 7, 1930 |
| 2,037,440 | Taylor | Apr. 14, 1936 |
| 2,091,990 | Jacobs | Sept. 7, 1937 |
| 2,093,640 | Millenaar | Sept 21, 1937 |